US012628060B2

(12) United States Patent
Hong

(10) Patent No.: US 12,628,060 B2
(45) Date of Patent: May 12, 2026

(54) NETWORK SWITCHING METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 307 days.

(21) Appl. No.: 18/283,147

(22) PCT Filed: Mar. 23, 2021

(86) PCT No.: PCT/CN2021/082390
§ 371 (c)(1),
(2) Date: Sep. 20, 2023

(87) PCT Pub. No.: WO2022/198441
PCT Pub. Date: Sep. 29, 2022

(65) Prior Publication Data
US 2024/0179595 A1      May 30, 2024

(51) Int. Cl.
*H04W 36/14*          (2009.01)
*H04W 48/10*          (2009.01)
*H04W 88/06*          (2009.01)

(52) U.S. Cl.
CPC ........... *H04W 36/14* (2013.01); *H04W 48/10* (2013.01); *H04W 88/06* (2013.01)

(58) Field of Classification Search
CPC ...... H04W 36/14; H04W 48/10; H04W 88/06
See application file for complete search history.

(56) References Cited

U.S. PATENT DOCUMENTS

| | | | | |
|---|---|---|---|---|
| 2011/0117963 A1* | 5/2011 | Wang | ..................... | H04W 48/18 |
| | | | | 455/558 |
| 2020/0382357 A1* | 12/2020 | Hu | ........................ | H04B 7/0695 |
| 2022/0053448 A1* | 2/2022 | Velev | ..................... | H04W 76/27 |
| 2022/0141723 A1* | 5/2022 | Patankar | ............... | H04W 24/02 |
| | | | | 455/436 |
| 2022/0150788 A1* | 5/2022 | Jiang | ................. | H04W 36/0085 |
| 2022/0210632 A1* | 6/2022 | Tseng | .................... | H04W 8/183 |
| 2022/0240213 A1* | 7/2022 | Ly | ........................ | H04W 60/04 |

(Continued)

FOREIGN PATENT DOCUMENTS

| | | |
|---|---|---|
| CN | 110337826 A | 10/2019 |
| CN | 110463249 A | 11/2019 |

(Continued)

OTHER PUBLICATIONS

State Intellectual Property Office of the People's Republic of China, First Office Action and Search Report Issued in Application No. 202180000586X, Oct. 22, 2024, 18 pages.

(Continued)

*Primary Examiner* — Melanie Jagannathan
(74) *Attorney, Agent, or Firm* — Volpe Koenig

(57)          ABSTRACT

A network switching method includes configuring a target parameter value for a multi-SIM terminal, wherein the target parameter value includes at least a target duration, and the target duration indicates a duration for which the multi-SIM terminal is allowed to leave a first network where the base station is located. The network switching method further includes sending the target parameter value.

20 Claims, 8 Drawing Sheets

Configure a target parameter value for a multi-SIM terminal, where the target parameter value includes at least a target duration that indicates a duration for which the multi-SIM terminal is allowed to leave a first network where the base station is located — 101

Send the target parameter value — 102

(56)     References Cited

U.S. PATENT DOCUMENTS

| | | | | |
|---|---|---|---|---|
| 2022/0264506 | A1* | 8/2022 | Kiss ...................... | H04W 60/00 |
| 2023/0254918 | A1* | 8/2023 | Gurumoorthy ......... | H04W 8/24 |
| | | | | 455/435.1 |
| 2023/0370911 | A1* | 11/2023 | Pu ......................... | H04W 8/183 |
| 2025/0098015 | A1* | 3/2025 | Kim ...................... | H04W 76/27 |

FOREIGN PATENT DOCUMENTS

| | | | |
|---|---|---|---|
| CN | 110710247 | A | 1/2020 |
| WO | 2020/138985 | A1 | 7/2020 |
| WO | 2021/007696 | A1 | 1/2021 |

OTHER PUBLICATIONS

State Intellectual Property Office of the People's Republic of China, Second Office Action and Search Report Issued in Application No. 202180000586X, Dec. 18, 2024, 20 pages.

ISA State Intellectual Property Office of the People's Republic of China, Written Opinion of the International Searching Authority Issued in Application No. PCT/CN2021/082390, Dec. 22, 2021, WIPO, 7 pages.

ISA State Intellectual Property Office of the People's Republic of China, International Search Report Issued in Application No. PCT/CN2021/082390, Dec. 22, 2021, WIPO, 4 pages.

Apple Inc. "Methods for Multi-SIM Network Switching", 3GPP TSG-RAN WG2 Meeting #112e R2-2009506, Nov. 13, 2020, 4 pages.

* cited by examiner

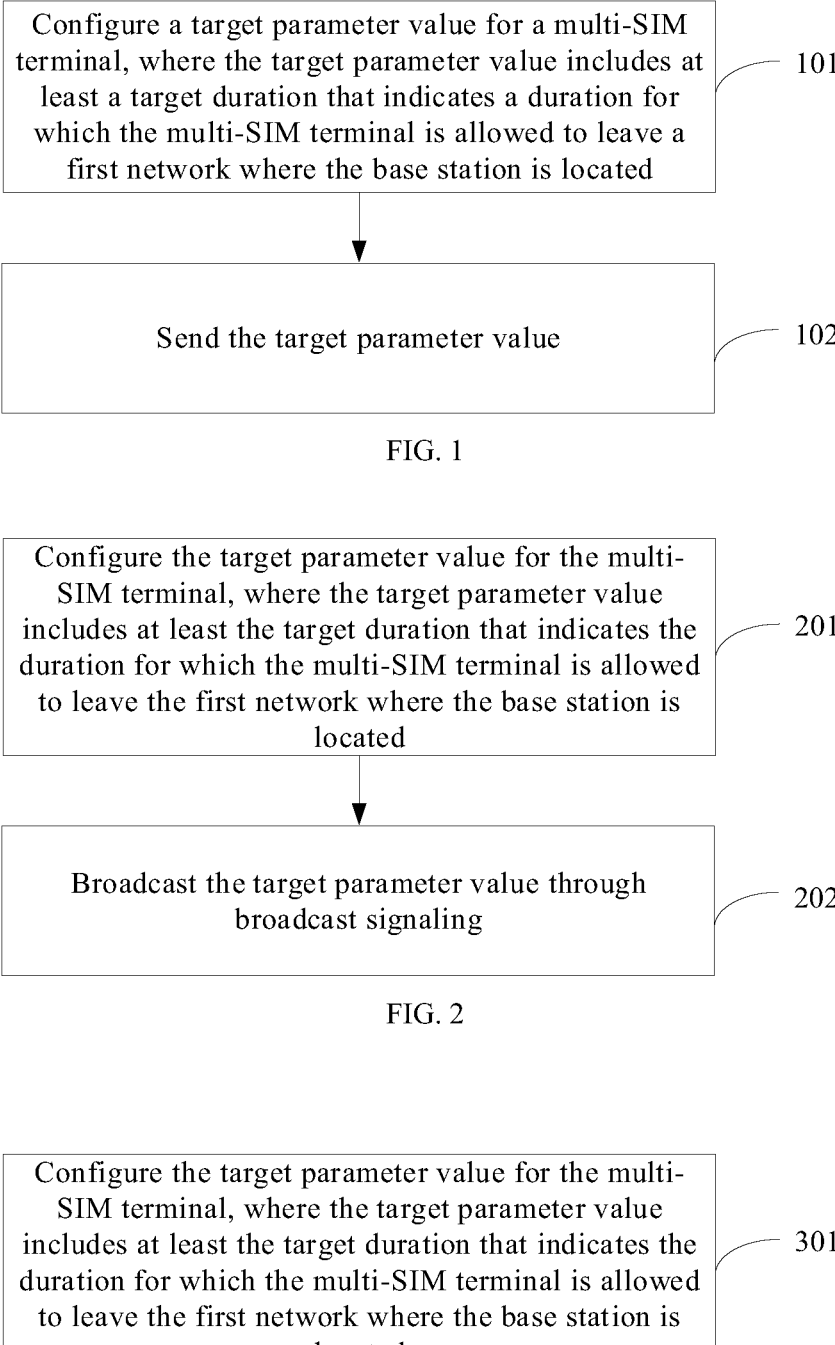

Configure a target parameter value for a multi-SIM
terminal, where the target parameter value includes at
least a target duration that indicates a duration for
which the multi-SIM terminal is allowed to leave a
first network where the base station is located — 101

Send the target parameter value — 102

FIG. 1

Configure the target parameter value for the multi-
SIM terminal, where the target parameter value
includes at least the target duration that indicates the
duration for which the multi-SIM terminal is allowed
to leave the first network where the base station is
located — 201

Broadcast the target parameter value through
broadcast signaling — 202

FIG. 2

Configure the target parameter value for the multi-
SIM terminal, where the target parameter value
includes at least the target duration that indicates the
duration for which the multi-SIM terminal is allowed
to leave the first network where the base station is
located — 301

Send the target parameter value to the multi-SIM
terminal through unicast signaling — 302

FIG. 3

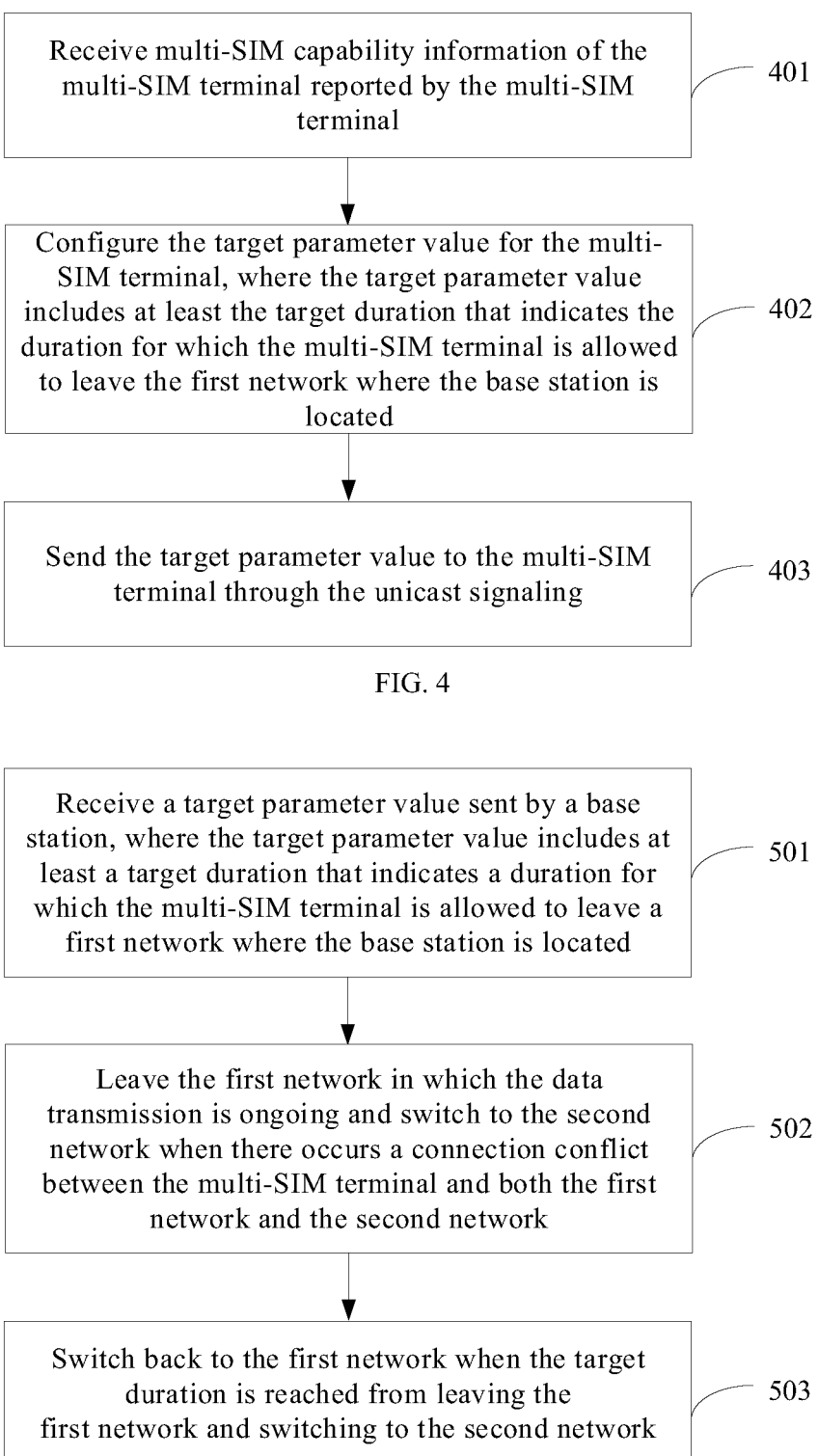

Receive multi-SIM capability information of the multi-SIM terminal reported by the multi-SIM terminal — 401

Configure the target parameter value for the multi-SIM terminal, where the target parameter value includes at least the target duration that indicates the duration for which the multi-SIM terminal is allowed to leave the first network where the base station is located — 402

Send the target parameter value to the multi-SIM terminal through the unicast signaling — 403

FIG. 4

Receive a target parameter value sent by a base station, where the target parameter value includes at least a target duration that indicates a duration for which the multi-SIM terminal is allowed to leave a first network where the base station is located — 501

Leave the first network in which the data transmission is ongoing and switch to the second network when there occurs a connection conflict between the multi-SIM terminal and both the first network and the second network — 502

Switch back to the first network when the target duration is reached from leaving the first network and switching to the second network — 503

FIG. 5

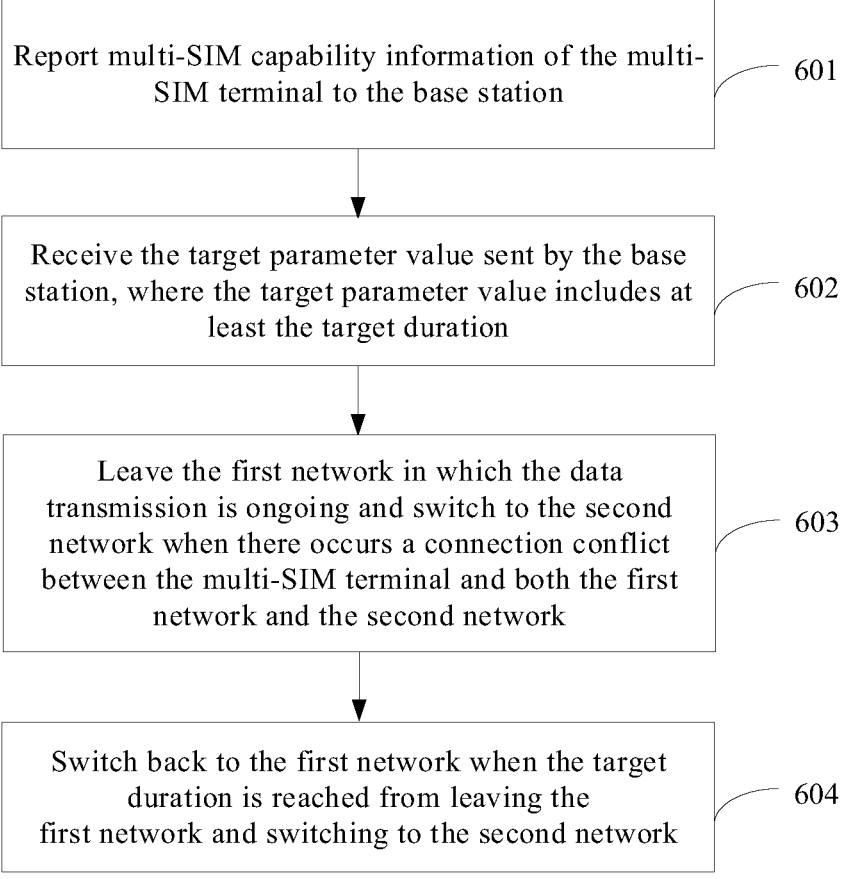

Report multi-SIM capability information of the multi-SIM terminal to the base station — 601

Receive the target parameter value sent by the base station, where the target parameter value includes at least the target duration — 602

Leave the first network in which the data transmission is ongoing and switch to the second network when there occurs a connection conflict between the multi-SIM terminal and both the first network and the second network — 603

Switch back to the first network when the target duration is reached from leaving the first network and switching to the second network — 604

FIG. 6

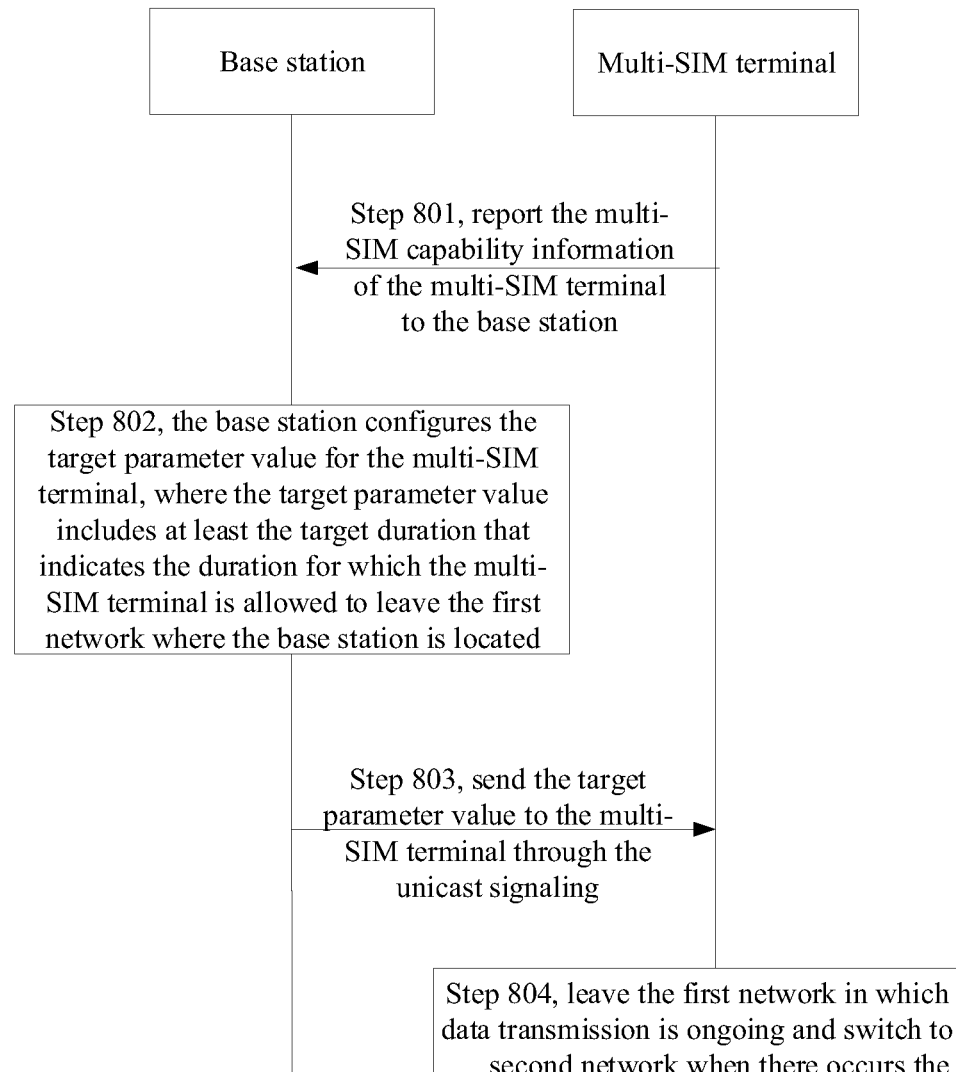

Base station

Multi-SIM terminal

Step 801, report the multi-SIM capability information of the multi-SIM terminal to the base station Step 802, the base station configures the target parameter value for the multi-SIM terminal, where the target parameter value includes at least the target duration that indicates the duration for which the multi-SIM terminal is allowed to leave the first network where the base station is located Step 803, send the target parameter value to the multi-SIM terminal through the unicast signaling Step 804, leave the first network in which the data transmission is ongoing and switch to the second network when there occurs the connection conflict between the multi-SIM terminal and both the first network and the second network Step 805, switch back to the first network when the target duration is reached from leaving the first network and switching to the second network

FIG. 8

NETWORK SWITCHING METHOD AND APPARATUS, AND STORAGE MEDIUM

CROSS-REFERENCE TO RELATED APPLICATION

This application is the U.S. national phase application of International Application No. PCT/CN2021/082390, filed on Mar. 23, 2021, the disclosure of which is incorporated herein by reference in its entirety for all purposes.

TECHNICAL FIELD

The present disclosure relates to the field of communications, and in particular, to network switching methods, apparatuses and storage media.

BACKGROUND

More and more multi-subscriber identity module (SIM) terminals appear as wireless communication technologies develop.

At present, processing modes on the multi-SIM terminals are implemented mainly depending on various terminal manufacturers and are not specified by a unified standard, thereby introducing many different terminal behaviors and processing modes, such as dual-SIM single-standby, dual-SIM dual-standby single-pass, dual-SIM dual-standby dual-pass, etc. Further, different terminal behaviors and processing modes may bring a plurality of multi-SIM problems in the multi-SIM terminals.

SUMMARY

In view of the above, the present disclosure provides a network switching method, a network switching apparatus, and a storage medium.

According to a first aspect of the present disclosure, a network switching method is provided. The method is applicable to a base station, including: configuring a target parameter value for a multi-subscriber identity module (SIM) terminal, wherein the target parameter value includes at least a target duration, and the target duration indicates a duration for which the multi-SIM terminal is allowed to leave a first network where the base station is located; and sending the target parameter value.

According to a second aspect of the present disclosure, a network switching method is provided. The method is applicable to a multi-SIM terminal, including: receiving a target parameter value sent by a base station, wherein the target parameter value includes at least a target duration, and the target duration indicates a duration for which the multi-SIM terminal is allowed to leave a first network where the base station is located; leaving the first network in which a data transmission is ongoing and switching to a second network in response to a connection conflict occurring between network connections, wherein the network connections are a network connection between the multi-SIM terminal and the first network and a network connection between the multi-SIM terminal and the second network, respectively; switching back to the first network in response to determining that the target duration is reached from leaving the first network and switching to the second network.

According to a third aspect of the present disclosure, a network switching apparatus is provided, including: one or more processors; and one or more memories for storing instructions executable by the one or more processors; wherein the one or more processors are configured to perform: configuring a target parameter value for a multi-SIM terminal, wherein the target parameter value includes at least a target duration, and the target duration indicates a duration for which the multi-SIM terminal is allowed to leave a first network where the base station is located; and sending the target parameter value.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of the description, illustrate examples consistent with the present disclosure and, together with the description, serve to explain the principles of the disclosure.

FIG. 1 illustrates a schematic flowchart of a network switching method according to an example.

FIG. 2 illustrates a schematic flowchart of another network switching method according to an example.

FIG. 3 illustrates a schematic flowchart of another network switching method according to an example.

FIG. 4 illustrates a schematic flowchart of another network switching method according to an example.

FIG. 5 illustrates a schematic flowchart of another network switching method according to an example.

FIG. 6 illustrates a schematic flowchart of another network switching method according to an example.

FIG. 8 illustrates a schematic flowchart of another network switching method according to an example.

DETAILED DESCRIPTION OF THE EMBODIMENTS

Figure 7:
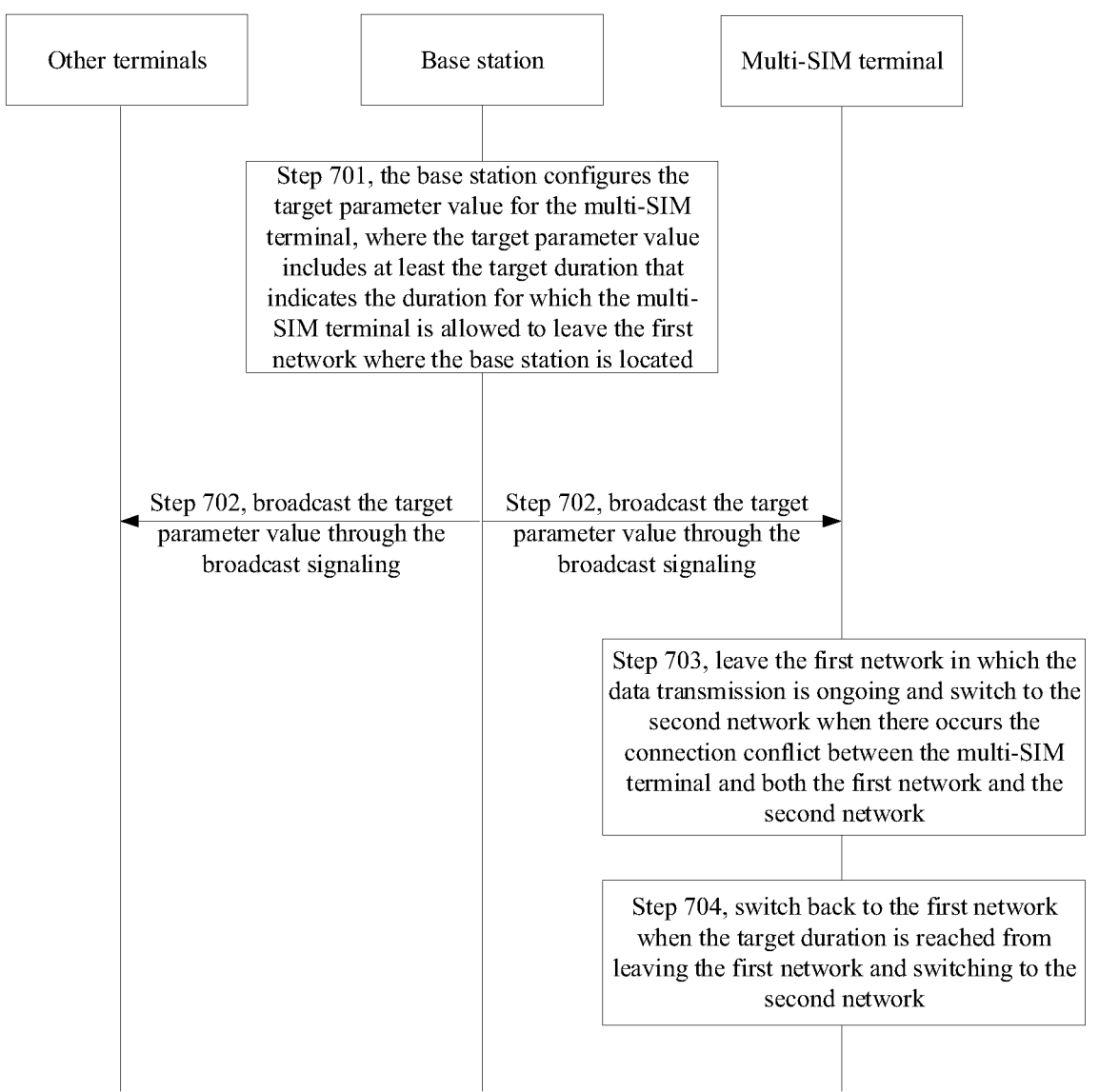
FIG. 7 illustrates a schematic flowchart of another network switching method according to an example.

Embodiments will be described in detail here, with examples illustrated in the drawings. When the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "said" and "the" in their singular forms in the present disclosure and the appended claims are also intended to include their plural forms, unless clearly indicated otherwise in the context. It can also be understood that the term "and/or" as used herein includes any and all possible combinations of one or more of the associated listed items.

It is to be understood that, although terms "first," "second," "third," and the like may be used in the present disclosure to describe various information, such information should not be limited to these terms. These terms are only used to distinguish the information of the same type from each other. For example, without departing from the scope of the present disclosure, first information may be referred as second information; and similarly, second information may also be referred as first information. Depending on the context, the word "if" as used herein may be interpreted as "when", "upon", or "in response to determining".

In the examples of the present disclosure, there may exist, but not limited to, the following multi-subscriber identity module (SIM) problems in a multi-SIM terminal.

Problem 1. The multi-SIM terminal, during communicating with a first network through one of its SIMs, is expected to keep a regular detecting for a second network accessed by another SIM, which includes but not limited to monitoring paging messages, performing system measurements, reading system messages, etc., and thus may bring an impact on a communication performance of the first network.

Problem 2. Paging occasions are calculated according to an identifier of the terminal. However, since the multi-SIM terminal has a plurality of SIMs, the paging occasions corresponding to the different SIMs may be identical, thereby resulting in systematic paging collisions.

Problem 3. During communicating with the first network through one of its SIMs, the multi-SIM terminal is to determine whether to perform a paging response when another SIM listens to a paging message from the second network. Nowadays, whether to perform the paging response is taken based on rules configured by a user.

Problem 4. The multi-SIM terminal has to stop a current service that is being performed in the first network when determining to respond to the paging message from the second network. If there is no a suspension mechanism for the current service, the multi-SIM terminal is to automatically disconnect its radio resource control (RRC) connection with the first network and leave the first network. The first network still keeps paging the multi-SIM terminal after the multi-SIM terminal leaves the first network, thereby causing a waste of paging resources.

Problem 5. When the terminal reads a paging or performs a system measurement in the second network, it causes a short gap in the first network, with a duration generally about 20 ms (milliseconds), which means that the first network undergoes a shadow fading (that strengths of received signals decrease in a mobile communication due to a shadow effect caused by obstacles, also called a slow fading because a median of field strengths changes slowly with geographical changes). Since the short gap occurs once in each paging cycle, a power control and link adaptation algorithm for the network may be affected, thereby causing a resource waste of the first network.

Problem 6. The terminal is to read system information in the second network when determining to switch to a cell in the second network, which results in a long gap in the first network, with a duration generally about 1 s. The long gap may be regarded by the first network as an error. In the related art, neither the base station nor the terminal can handle this situation.

Problem 7. A longer gap may be introduced in the first network during the terminal performs a tracking area update (TAU), which may be up to several seconds, thereby resulting in a greater impact on the first network.

In view of the above problem 4 to problem 7, the multi-SIM terminal is to stop its current RRC connection with the first network. That is, the current service of the multi-SIM terminal in the first network is to be broken.

In order to ensure a process that the multi-SIM terminal leaves the first network in which a data transmission is ongoing and switches to the second network to perform a service cannot bring significant impact on the service in the first network or cause operation errors in the first network, the present disclosure provides the following network switching schedules.

The network switching methods provided by the present disclosure are described first from a base station side.

An example of the present disclosure provides a network switching method. In referring to FIG. 1 which is a flowchart of a network switching method according to an example, the method is applicable to a base station and includes the following steps 101 and 102 in the example of the present disclosure.

At step 101, a target parameter value is configured for a multi-SIM terminal. The target parameter value includes at least a target duration. The target duration indicates a duration for which the multi-SIM terminal is allowed to leave a first network where the base station is located.

In the example of the present disclosure, the first network refers to a network in which the base station is located. The multi-SIM terminal may switch back to the first network when the target duration is reached from leaving the first network in which a data transmission is ongoing.

At step 102, the target parameter value is sent.

In the above example, the base station configures for the multi-SIM terminal and sends the target parameter value, which can ensure a procedure that the multi-SIM terminal leaves the first network in which the data transmission is ongoing and switches to the second network to perform a service cannot bring significant impact on the service in the first network or cause operation errors in the first network, thereby achieving high availability.

In a possible implementation, the base station may configure the target parameter value for the multi-SIM terminal according to a service requirement of a first service that is being currently performed by the multi-SIM terminal in the first network.

In alternative or additional examples, the service requirement includes but not limited to at least one of a service delay requirement or a service throughput requirement. The lower the service delay requirement of the first service is, the greater the target parameter value may be. Likewise, the lower the service throughput requirement of the first service is, the greater the target parameter value may be. Conversely, the higher the service delay requirement of the first service or the service throughput requirement of the first service is, the smaller the target parameter value may be.

As an example, the first service requires a lower service delay. Even if the target duration for which the multi-SIM terminal leaves the first network and switches to the second network is longer, the first service is not significantly affected. Therefore, the target duration configured by the base station for which the multi-SIM terminal is allowed to leave the first network and switch to the second network may be longer.

As another example, the first service requires a higher service throughput. The longer target duration for which the multi-SIM terminal leaves the first network and switches to the second network inevitably affects the first service. Therefore, the target duration configured by the base station is to be shorter.

In another possible implementation, the base station may configure the target parameter value according to a service requirement of a second service to be performed by the multi-SIM terminal in the second network. The service requirement includes but not limited to the service delay requirement and the service throughput requirement.

The second network refers to a network to which the multi-SIM terminal is expected to connect after leaving the first network. In an example, the first network is a network in which a data transmission established between SIM #1 of the multi-SIM and the base station is ongoing, and the second network is a network to which the multi-SIM connects through SIM #2 after leaving the first network.

The lower the service delay requirement of the second service to be performed is, the smaller the target parameter value may be. Likewise, the lower the service throughput requirement of the second service to be performed is, the smaller the target parameter value may be. Conversely, the higher the service delay requirement of the second service or the service throughput requirement of the second service is, the greater the target parameter value may be.

As an example, the second service to be performed requires a lower service delay, and correspondingly, the target duration for which the multi-SIM terminal leaves the first network and switches to the second network may be shorter, so as to avoid affecting the first service that is being performed by the multi-SIM terminal in the first network as much as possible.

As another example, the second service requires a higher service throughput, and the target duration for which the multi-SIM terminal leaves the first network and switches to the second network may be longer. Thereby avoiding affecting the first service that is currently performed by the multi-SIM terminal in the first network, meanwhile ensuring the service requirement of the second service to be performed by the multi-SIM terminal in the second network.

In another possible implementation, the base station may configure the target parameter value according to a difference between the service requirement of the first service that is being performed by the multi-SIM terminal in the first network and the service requirement of the second service to be performed in the second network.

Alternatively or additionally, the service requirement includes but not limited to at least one of the service delay requirement or the service throughput requirement. The higher the service delay requirement of the first service relative to the second service is, the shorter the target duration may be. Likewise, the higher the service throughput requirement of the first service relative to the second service is, the shorter the target duration may be. Conversely, the lower the service delay requirement of the first service relative to the second service is, the longer the target duration may be. Likewise, the lower the service throughput requirement of the first service relative to the second service is, the longer the target duration may be.

In the above examples, the base station may configure the target parameter value according to the service requirement of the first service that is being performed by the multi-SIM terminal in the first network, or may configure the target parameter value according to the second service requirement to be performed by the multi-SIM terminal in the second network, or configure the target parameter value according to the difference between the service requirement of the first service and the service requirement of the second service. Similarly, it can ensure the procedure that the multi-SIM terminal leaves the first network where the base station is located and switches to the second network to perform a service cannot bring significant impact on the service in the first network or cause operation errors in the first network, thereby achieving high availability.

In some alternative or additional examples, in referring to FIG. 2 that is a flowchart of a network switching method according to an example, the method is applicable to the base station in the first network in which the multi-SIM terminal is performing the data transmission, and the method may include the following steps 201 and 202.

At step 201, the target parameter value is configured for the multi-SIM terminal. The target parameter value includes at least the target duration. The target duration indicates the duration for which the multi-SIM terminal is allowed to leave the first network where the base station is located.

At step 202, the target parameter value is broadcast through broadcast signaling.

In a possible implementation, the base station may make a target system information block (SIB) carry the target parameter value, and broadcast the target SIB carrying the target parameter value through the broadcast signaling.

The target SIB may be an SIB specified by a standard. In some examples, the target SIB may be SIB1, or any one of SIB2, SIB3, SIB7 to SIB9. Alternatively, the target SIB may be a newly introduced SIB which may indicate the target parameter value at least, which is not limited by the present disclosure.

In the above examples, the base station may configure the target parameter value for the multi-SIM terminal. Further, the base station broadcasts the target parameter value through the broadcast signaling, so that the multi-SIM terminal can receive the target parameter value in the broadcast signaling. Therefore, in the case where there is a connection conflict between the multi-SIM terminal and both the first network and the second network, the multi-SIM terminal automatically leaves the first network in which the data transmission is ongoing and switches to the second network. In the case where the target duration included in the target parameter value is reached from leaving the first network, the multi-SIM terminal is to switch back to the first network. Therefore, it can ensure that the procedure that the multi-SIM terminal leaves the first network and switches to the second network to perform a service cannot bring a significant impact on the service in the first network or cause operation errors in the first network, thereby achieving high availability.

In some alternative or additional examples, in referring to FIG. 3 that is a flowchart of a network switching method according to an example, the method is applicable to the base station in the first network in which the multi-SIM terminal is performing the data transmission, and the method may include the following steps 301 and 302.

At step 301, the target parameter value is configured for the multi-SIM terminal. The target parameter value includes at least the target duration. The target duration indicates the duration for which the multi-SIM terminal is allowed to leave the first network where the base station is located.

At step 302, the target parameter value is sent to the multi-SIM terminal through unicast signaling.

In a possible implementation, the base station may send the target parameter value to the multi-SIM terminal through RRC Reconfiguration (RRCReconfiguration) signaling. Alternatively or additionally, the base station may make other configuration (otherconfig) signaling of the RRCReconfiguration signaling carry the target parameter value, and send the otherconfig signaling to the multi-SIM terminal.

In another possible implementation, the base station receives an acquisition request that is sent by the multi-SIM terminal for requesting to acquire on-demand system information (SI) from the base station. The base station may send, after adding the target parameter value into the on-demand SI based upon the acquisition request, the on-demand SI with the target parameter value added to the multi-SIM terminal through the unicast signaling.

In the above examples, the base station may configure the target parameter value for the multi-SIM terminal. Further, the base station sends the target parameter value to the multi-SIM terminal through the unicast signaling, so that the multi-SIM terminal can receive the target parameter value in the unicast signaling. Therefore, in the case where a connection conflict occurs between the multi-SIM terminal and both the first network and the second network, the multi-SIM terminal automatically leaves the first network and switches to the second network. In the case where the target duration included the target parameter value is reached from leaving the first network, the multi-SIM terminal is to switch back to the first network. Therefore, it can ensure the procedure that the multi-SIM terminal leaves the first network in which the data transmission is ongoing and switches to the second network to perform a service cannot bring significant impact on the service in the first network or cause operation errors in the first network, thereby achieving high availability.

In some alternative or additional examples, in referring to FIG. 4 which is a flowchart of a network switching method according to an example, the method is applicable to the base station and may include the following steps 401-403.

At step 401, multi-SIM capability information of the multi-SIM terminal reported by the multi-SIM terminal is received.

In the examples of the present disclosure, the multi-SIM capability information refers to terminal capability information supported by the multi-SIM terminal and associated with the plurality of SIMs. The multi-SIM capability information may include but not limited to a count of SIMs supported by the multi-SIM terminal, a current status of each SIM (for example, whether it is in active), and operator information corresponding to each SIM obtained.

At step 402, the target parameter value is configured for the multi-SIM terminal. The target parameter value includes at least the target duration. The target duration indicates the duration for which the multi-SIM terminal is allowed to leave the first network where the base station is located.

At step 403, the target parameter value is sent to the multi-SIM terminal through the unicast signaling.

In the examples of the present disclosure, based on the multi-SIM capability information of the multi-SIM terminal that is acquired in advance, the base station may send the target parameter value pertinently to the multi-SIM terminal through the unicast signaling. The approach of sending the target parameter value to the multi-SIM terminal through the unicast signaling is the same as the above-mentioned step 302, which is not repeated here.

In the above examples, the base station receives the multi-SIM capability information reported by the multi-SIM terminal in advance, so then the target parameter value configured for the multi-SIM terminal is sent to the multi-SIM terminal through the unicast signaling, which can send the target parameter value pertinently to the multi-SIM terminal, without occupying broadcast signaling resources, thereby achieving high availability.

In some alternative or additional examples, the target duration may indicate the duration for which the multi-SIM terminal is allowed to leave the first network within a preset time period.

In some alternative or additional examples, the target duration indicates the duration for which the multi-SIM terminal is allowed to leave the first network in which the data transmission is ongoing within the preset time period when there occurs the connection conflict occurring between the network connections, where the network connections are a network connection between the multi-SIM terminal and the first network and a network connection between the multi-SIM terminal and a second network, respectively.

That is, when a connection conflict arises between the network connection of the multi-SIM terminal to the first network and its network connection to the second network, the multi-SIM terminal may leave the first network and connect to the second network within a preset time period. The multi-SIM terminal may no longer perform the network switching after the preset time period expires, which can further ensure that the procedure that the multi-SIM terminal leaves the first network where the base station is located and switches to the second network to perform a service cannot bring significant impact on the service in the first network or cause operation errors in the first network.

In a possible implementation, the target duration may be represented by a time length.

For example, the target duration configured by base station #1 for the multi-SIM terminal indicates that the duration is 20 milliseconds. For the duration, the multi-SIM is allowed to leave, within 2 seconds, the first network in which the data transmission is ongoing. The first network refers to a network in which base station #1 is located and which corresponds to operator #1, and the multi-SIM terminal has accessed base station #1. The second network refers to a network in which base station #2 is located and which corresponds to operator #2. Operator #1 and operator #2 may be the same or different.

When the multi-SIM terminal determines that there occurs the connection conflict between its network connection with the first network and its network connection with the second network, supposing that it may leave base station #1 and access base station #2 at the 5th millisecond and last for 20 milliseconds, the multi-SIM terminal is to switch back to base station #1 at the 25th millisecond.

In another possible implementation, the target duration may be represented by at least one of a subframe amount or a frame amount.

For example, the target duration is n subframes. In the case where a connection conflict occurs between the multi-SIM terminal and both the first network and the second network, the multi-SIM terminal leaves the first network in which the data transmission is ongoing and switches to the second network at the m-th subframe, and is to switch back to the first network at the (m+n)-th subframe.

In the above examples, the target parameter value configured by the base station for the multi-SIM terminal includes at least the target duration. The target duration may be represented in various ways, which can be easily implemented and achieve high availability.

In some alternative or additional examples, the target parameter value configured by the base station for the multi-SIM terminal further includes a target number of times. The target number of times indicates a maximum number of times the multi-SIM terminal is allowed to leave the first network.

Alternatively or additionally, the multi-SIM terminal may leave the first network in which the data transmission is ongoing and switch to the second network for several times within the preset time period, to perform the second service corresponding to the second network. However, the total number of times of leaving the first network has to be less than or equal to the target number of times configured by the base station.

In the above examples, in addition to the target duration, the target parameter value configured by the base station for the multi-SIM terminal may also include the maximum number of times the multi-SIM terminal is allowed to leave the first network. Therefore, it also ensures that the service in the second network can be timely processed when ensuring the procedure that the multi-SIM terminal leaves the first network in which the data transmission is ongoing and switches to the second network to perform the service cannot bring significant impact on the service in the first network or cause operation errors in the first network, thereby achieving higher availability.

The network switching schemes provided by the present disclosure are next described from a multi-SIM terminal side.

An example of the present disclosure provides a network switching method. In referring to FIG. 5 which is a flowchart of a network switching method according to an example, the method is applicable to a multi-SIM terminal and includes the following steps 501-503.

At step 501, a target parameter value sent by a base station is received. The target parameter value includes at least a target duration. The target duration indicates a duration for which the multi-SIM terminal is allowed to leave a first network where the base station is located.

In the example of the present disclosure, the first network refers to a network in which the base station is located, and the multi-SIM terminal is performing a data transmission with the base station through one of its SIMs. A second network refers to a network to which another SIM of the multi-SIM terminal is expected to connect.

At step 502, the multi-SIM terminal leaves the first network in which the data transmission is ongoing and switches to the second network when a connection conflict occurs between the multi-SIM terminal and both the first network and the second network.

In the example of the present disclosure, in the case where the connection conflict occurs between the multi-SIM terminal and both the first network and the second network, the multi-SIM terminal may determine the time point to leave the first network according to its own requirements. A connection to the second network may be established after leaving the first network, so as to read paging messages from the second network, read system messages from the second network, perform TAUs or perform cell measurement, etc.

At step 503, it switches back to the first network when the target duration is reached from leaving the first network and switching to the second network.

In the example of the present disclosure, if the duration for which the multi-SIM terminal leaves the first network reaches the target duration, the multi-SIM terminal is expected to switch back to the first network, thereby avoiding bringing significant impact on the service that is being performed in the first network or causing operation errors in the first network.

In the above example, in the case where there occurs the connection conflict between the multi-SIM terminal and both the first network and the second network, it ensures the procedure that the multi-SIM terminal leaves the first network in which the data transmission is ongoing and switches to the second network to perform a service cannot bring significant impact on the service in the first network or cause the operation errors in the first network, thereby achieving high availability.

In some alternative or additional examples, during the procedure of leaving the first network, switching to the second network and communicating with the second network, the multi-SIM terminal may stop performing at least one of a data transmission or a signaling transmission with the base station in the first network. Thereby avoiding bringing an impact on the service corresponding to the second network.

In a possible implementation, the multi-SIM terminal may receive the target parameter value broadcast by the base station through broadcast signaling. In some examples, the base station adds the target parameter value into a target SIB and broadcasts the target SIB through the broadcast signaling. The multi-SIM terminal may receive the target SIB broadcast by the base station, so as to obtain the target parameter value carried in the target SIB. The target SIB includes but not limited to any one of SIBs that have been specified in a standard. Alternatively, the target SIB is an SIB newly introduced in the standard for indicating at least the target parameter value.

In another possible implementation, the multi-SIM terminal may receive the target parameter value sent by the base station to the multi-SIM terminal through unicast signaling. Correspondingly, in referring to FIG. 6 which is a flowchart of a network switching method according to an example, the method is applicable to the multi-SIM terminal and may include the following steps 601-604.

At step 601, multi-SIM capability information of the multi-SIM terminal is reported to the base station.

In the example of the present disclosure, the multi-SIM capability information refers to terminal capability information supported by the multi-SIM terminal and associated with a plurality of SIMs. The multi-SIM capability information may include but not limited to a count of SIMs supported by the multi-SIM terminal, a current status of each SIM (for example, whether it is in active), and operator information corresponding to each SIM obtained.

At step 602, the target parameter value sent by the base station to the multi-SIM terminal through the unicast signaling is received. The target parameter value includes at least the target duration.

In the example of the present disclosure, the base station may send the target parameter value to the multi-SIM terminal through RRC reconfiguration signaling, or the base station may send the target parameter value to the multi-SIM terminal through on-demand system information.

At step 603, the multi-SIM terminal leaves the first network in which the data transmission is ongoing and switches to the second network when the connection conflict occurs between the multi-SIM terminal and both the first network and the second network.

At step 604, it switches back to the first network when the target duration is reached from leaving the first network and switching to the second network.

In the above example, the multi-SIM terminal reports the multi-SIM capability information of the multi-SIM terminal to the base station in advance, so that the base station can send the target parameter value pertinently to the multi-SIM terminal through the unicast signaling, which saves broadcast signaling resources of the base station and achieves high availability.

In a possible implementation, the multi-SIM terminal may report the multi-SIM capability information to the base station during establishing a connection with the base station.

In some examples, the multi-SIM terminal may report the multi-SIM capability information to the base station through one or more target messages sent to the base station in a random access process. The one or more target messages may include but not limited to at least one of message 1, message 3 and message 5 in the random access process.

In another possible implementation, the multi-SIM terminal may report the multi-SIM capability information to the base station after establishing the connection with the base station.

In some examples, after establishing the connection with the base station, the multi-SIM terminal may report the multi-SIM capability information to the base station through UE-CapabilityRAT-ContainerList signaling.

In the above examples, the multi-SIM terminal may report the multi-SIM capability information to the base station during or after establishing the connection with the base station, so as to facilitate the base station to send the target parameter value pertinently to the multi-SIM terminal through the unicast signaling, which is easy to implement and achieves high availability.

In some alternative or additional examples, the target duration indicates the duration for which the multi-SIM terminal is allowed to leave the first network within a preset time period.

In some alternative or additional examples, the target duration indicates the duration for which the multi-SIM terminal is allowed to leave the first network in which the data transmission is ongoing within the preset time period when there occurs the connection conflict occurring between the network connections, where the network connections are a network connection between the multi-SIM terminal and the first network and a network connection between the multi-SIM terminal and the second network, respectively.

In a possible implementation, the target duration may be represented by a time length. In another possible implementation, the target duration may be represented by at least one of a subframe amount or a frame amount.

In some alternative or additional examples, in referring to FIG. 7 which is a flowchart of a network switching method according to an example, the method may include the following steps 701-704.

At step 701, the base station configures the target parameter value for the multi-SIM terminal. The target parameter value includes at least the target duration. The target duration indicates the duration for which the multi-SIM terminal is allowed to leave a first network where the base station is located.

At step 702, the base station broadcasts the target parameter value through the broadcast signaling.

In some examples, the base station broadcasts a target SIB through the broadcasting signaling after adding the target parameter value into the target SIB.

At step 703, the multi-SIM terminal leaves the first network in which the data transmission is ongoing and switches to the second network when the connection conflict occurs between the multi-SIM terminal and both the first network and the second network.

At step 704, the multi-SIM terminal switches back to the first network when the target duration is reached from leaving the first network and switching to the second network.

In the above examples, it can ensure that the procedure that the multi-SIM terminal leaves the first network in which a data transmission is ongoing and switches to the second network to perform a service cannot bring significant impact on the service in the first network or cause operation errors in the first network, thereby achieving high availability.

In some alternative or additional examples, in referring to FIG. 8 that illustrates a flowchart of a network switching method according to an example, the method may include the following steps 801-805.

At step 801, the multi-SIM terminal reports the multi-SIM capability information of the multi-SIM terminal to the base station.

In some examples, the multi-SIM terminal may report the multi-SIM capability information to the base station during establishing the connection with the base station, or report the multi-SIM capability information to the base station after establishing the connection with the base station.

At step 802, the base station configures the target parameter value for the multi-SIM terminal. The target parameter value includes at least the target duration. The target duration indicates the duration for which the multi-SIM terminal is allowed to leave the first network where the base station is located.

At step 803, the base station sends the target parameter value to the multi-SIM terminal through the unicast signaling.

At step 804, the multi-SIM terminal leaves the first network in which the data transmission is ongoing and switches to the second network when the connection conflict occurs between the multi-SIM terminal and both the first network and the second network.

At step 805, the multi-SIM terminal switches back to the first network when the target duration is reached from leaving the first network and switching to the second network.

In the above examples, it can ensure the procedure that the multi-SIM terminal leaves the first network in which the data transmission is ongoing and switches to the second network to perform a service cannot bring significant impact on the service in the first network or cause operation errors in the first network, thereby achieving high availability.

Corresponding to the foregoing method examples implementing the application functions, the present disclosure further provides apparatus examples implementing the application functions.

Figure 9:
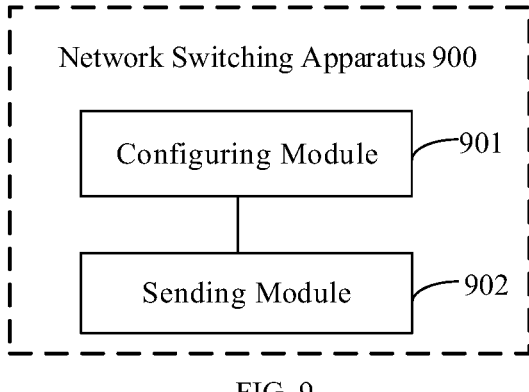
FIG. 9 illustrates a block diagram of a network switching apparatus according to an example.

In referring to FIG. 9 which illustrates a block diagram of a network switching apparatus 900 according to an example, the apparatus 900 is applicable to a base station and includes a configuring module 901 and a sending module 902.

The configuring module 901 is configured to configure a target parameter value for a multi-SIM terminal, where the target parameter value includes at least a target duration, and the target duration indicates a duration for which the multi-SIM terminal is allowed to leave a first network where the base station is located.

The sending module 902 is configured to send the target parameter value.

Figure 10:
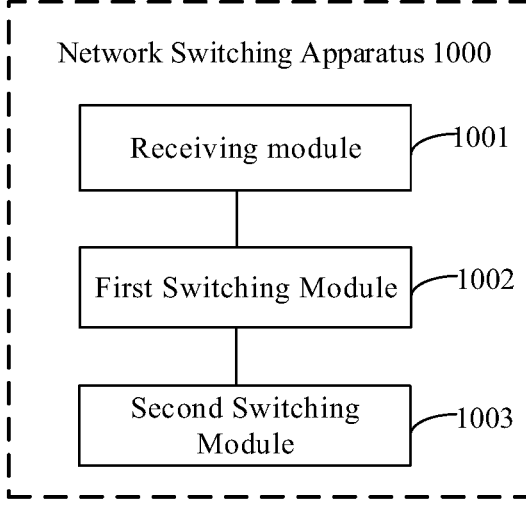
FIG. 10 illustrates a block diagram of another network switching apparatus according to an example.

In referring to FIG. 10 which illustrates a block diagram of a network switching apparatus 1000 according to an example, the apparatus 1000 is applicable to a multi-SIM terminal and includes a receiving module 1001, a first switching module 1002, and a second switching module 1003.

The receiving module 1001 is configured to receive a target parameter value sent by a base station. Where the target parameter value includes at least a target duration, and the target duration indicates a duration for which the multi-SIM terminal is allowed to leave a first network where the base station is located.

The first switching module 1002 is configured to leave the first network in which a data transmission is ongoing and switch to a second network in response to a connection conflict occurring between network connections. Where the network connections are a network connection between the multi-SIM terminal and the first network and a network connection between the multi-SIM terminal and the second network, respectively.

The second switching module 1003 is configured to switch back to the first network in response to determining that the target duration is reached from leaving the first network and switching to the second network.

Since the apparatus examples essentially correspond to the method examples, reference may be made to the description of related parts of the method examples. The apparatus examples described above are merely illustrative, in which the units described as separate components may or may not be physically separated, and the components displayed as the units may or may not be physical units, that is, may be located in one place or distributed to a plurality of units in a network. Some or all of the modules may be selected according to actual needs to achieve the purpose of the implementations of the present disclosure. It can be understood and implemented by those of ordinary skill in the art without any creative effort.

Correspondingly, the present disclosure also provides a network switching apparatus, including: one or more processors; and one or more memories for storing instructions executable by the one or more processors. The one or more processors are configured to perform any one of the network switching methods at the base station side.

Figure 11:
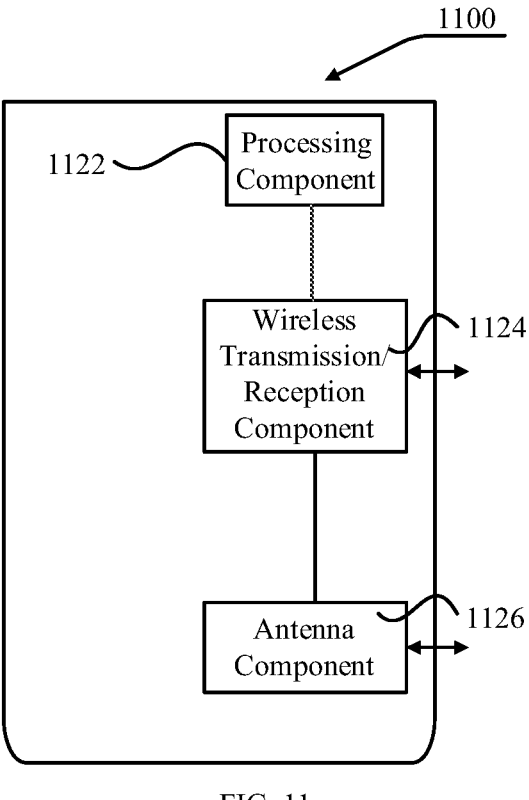
FIG. 11 illustrates a schematic structure diagram of a network switching apparatus according to an example of the present disclosure.

As illustrated in FIG. 11, FIG. 11 illustrates a schematic structure diagram of a network switching apparatus 1100 according to an example. The apparatus 1100 may be provided as a base station. In referring to FIG. 11, the apparatus 1100 includes a processing component 1122, a wireless transmission/reception component 1124, an antenna component 1126, and a signal processing part peculiar to a wireless interface. The processing component 1122 may further include one or more processors, not shown.

One of the processors in the processing component 1122 may be configured to perform any one of the above network switching methods.

Correspondingly, the present disclosure also provides a network switching apparatus, including: one or more processors; and one or more memories for storing instructions executable by the one or more processors. The one or more processors are configured to perform any one of the network switching methods at the multi-SIM terminal side.

Figure 12:
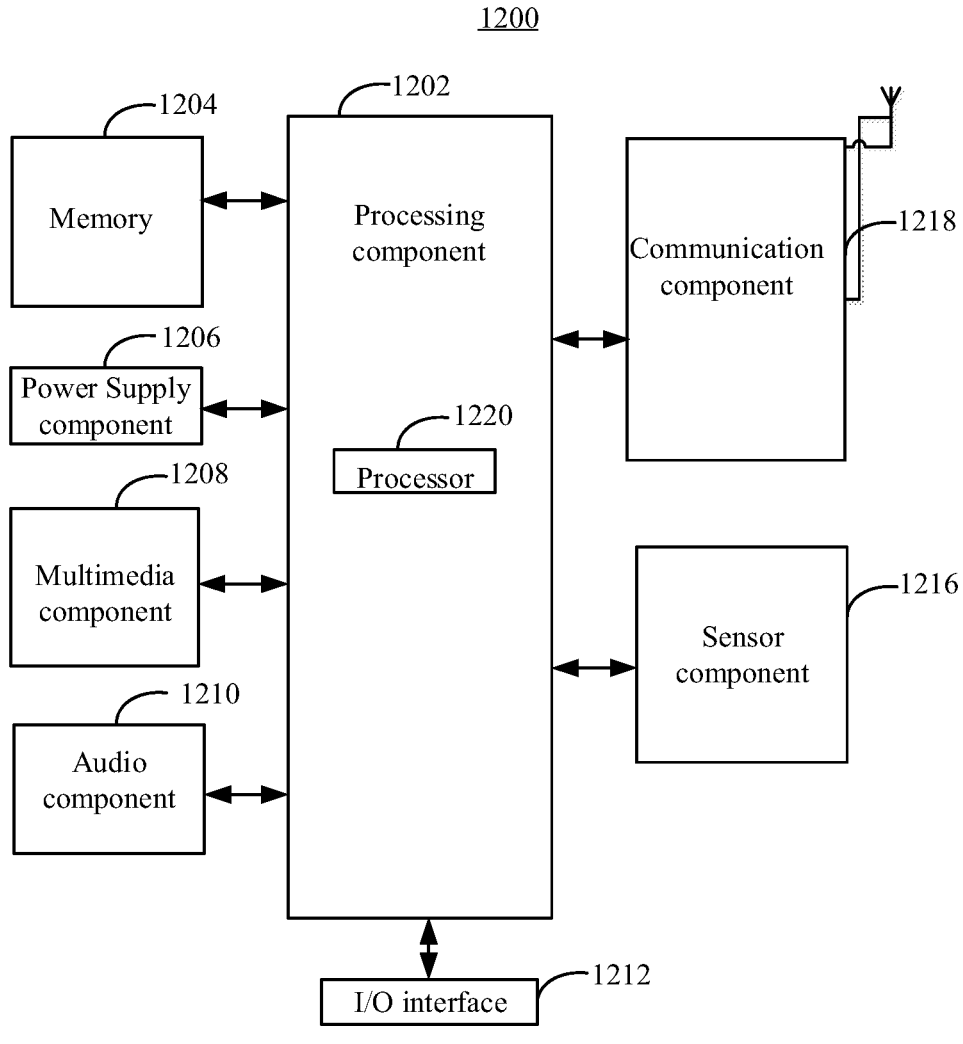
FIG. 12 illustrates a schematic structure diagram of another network switching apparatus according to an example of the present disclosure.

FIG. 12 illustrates a block diagram of an electronic device 1200 according to an example. For example, the electronic device 1200 may be a multi-SIM terminal including a plurality of SIMs, such as a mobile phone, a tablet, an e-book reader, a multimedia player, a wearable device, an in-vehicle terminal, an iPad, a smart TV.

In referring to FIG. 12, the electronic device 1200 may include one or more of the following components: a processing component 1202, a memory 1204, a power supply component 1206, a multimedia component 1208, an audio component 1210, an input/output (I/O) interface 1212, a sensor component 1216, and a communication component 1218.

The processing component 1202 generally controls the overall operations of the electronic device 1200, such as operations associated with display, phone calls, data paging, camera operations, and recording operations. The processing element 1202 may include one or more processors 1220 to execute instructions to complete all or a part of the steps of the above network switching methods. In addition, the processing component 1202 may include one or more modules that facilitate the interaction between the processing component 1202 and other components. As an example, the processing component 1202 may include a multimedia module to facilitate the interaction between the multimedia component 1208 and the processing component 1202. As another example, the processing component 1202 may read executable instructions from one or more memories to implement the steps of the network switching method provided by each of the above examples.

The memory 1204 is configured to store various types of data to support the operations of the electronic device 1200. Examples of such data include instructions for any application program or method operated on the electronic device 1200, contact data, phonebook data, messages, pictures, videos, and the like. The memory 1204 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 1206 provides power for various components of the electronic device 1200. The power supply component 1206 may include a power management system, one or more power supplies, and other components associated with generating, managing, and distributing power for the electronic device 1200.

The multimedia component 1208 includes a screen providing an output interface between the electronic device 1200 and a user. In some examples, the multimedia component 1208 includes a front camera and/or a rear camera. The front camera and/or rear camera may receive external multimedia data when the electronic device 1200 is in an operating mode, such as a photographing mode or a video mode. Each front camera and rear camera may be a fixed optical lens system or have a focal length and optical zooming capability.

The audio component 1210 is configured to output and/or input audio signals. For example, the audio component 1210 includes a microphone (MIC) that is configured to receive an external audio signal when the electronic device 1200 is in an operating mode, such as a call mode, a recording mode, and a voice recognition mode. The received audio signal may be further stored in the memory 1204 or transmitted via the communication component 1218. In some examples, the audio component 1210 also includes a speaker for outputting audio signals.

The I/O interface 1212 provides an interface between the processing component 1202 and a peripheral interface module. The above peripheral interface module may be a keyboard, a click wheel, buttons, or the like. These buttons may include but not limited to a home button, a volume button, a start button and a lock button.

The sensor component 1216 includes one or more sensors to provide the electronic device 1200 with status assessments in various aspects. For example, the sensor component 1216 may detect an open/closed state of the electronic device 1200 and a relative positioning of components such as the display and keypad of the electronic device 1200, and the sensor component 1216 may also detect a change in position of the electronic device 1200 or of a component of the electronic device 1200, the presence or absence of the user contact with the electronic device 1200, orientation or acceleration/deceleration of the electronic device 1200, and temperature change of the electronic device 1200. The sensor component 1216 may include a proximity sensor configured to detect the presence of a nearby object without any physical contact. The sensor component 1216 may further include an optical sensor, such as a complementary metal-oxide-semiconductor (CMOS) or charged coupled device (CCD) image sensor which is used in imaging applications. In some examples, the sensor component 1216 may also include an acceleration sensor, a gyro sensor, a magnetic sensor, a pressure sensor, or a temperature sensor.

The communication component 1218 is configured to facilitate wired or wireless communication between the electronic device 1200 and other devices. The electronic device 1200 may access a wireless network based on a communication standard, such as WiFi, 2G, 3G, 4G, 5G or 6G, or a combination thereof. In one example, the communication component 1218 receives broadcast signals or broadcast related information from an external broadcast management system via a broadcast channel. In an example, the communication component 1218 also includes a near field communication (NFC) module to facilitate short-range paging. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the electronic device 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing any one of the above network switching methods at a multi-SIM terminal side.

In one or more examples, a non-transitory computer-readable storage medium including instructions, e.g., the memory 1204 including instructions, is provided. These instructions may be executed by the processor 1220 of the electronic device 1200 to complete the above network switching methods. For example, the non-transitory computer-readable storage medium may be a read-only memory (ROM), a random access memory (RAM), a CD-ROM, a magnetic tape, a floppy disk, an optical data storage device, and the like.

In the present disclosure, a base station configures for a multi-SIM terminal and sends a target parameter value. The target parameter value includes at least a target duration, and the target duration indicates a duration for which the multi-SIM terminal is allowed to leave a first network where the base station is located. In the case where there is a connection conflict between a network connection of the multi-SIM terminal and the first network and a network connection of the multi-SIM terminal and a second network, the multi-SIM terminal leaves the first network in which a data transmission is ongoing and switches to the second network automatically, and in the case where the target duration is reached from leaving the first network, the multi-SIM terminal switches back to the first network automatically. Therefore, it can ensure a procedure that the multi-SIM terminal leaves the first network in which the data transmission is ongoing and switches to the second network to perform a service cannot bring significant impact on the service in the first network or cause operation errors in the first network, thereby achieving high availability.

Other implementations of the present disclosure will be readily apparent to those skilled in the art after implementing the disclosure by referring to the description. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A network switching method, performed by a base station, comprising:
    configuring a target parameter value for a multi-subscriber identity module (SIM) terminal, wherein the target parameter value comprises at least a target duration, and the target duration indicates a duration allowed for the multi-SIM terminal from leaving a first network where the base station is located to switching back to the first network; and
    sending the target parameter value.

2. The method according to claim 1, wherein configuring the target parameter value for the multi-SIM terminal comprises any one of:
    configuring the target parameter value according to a service requirement of a first service that is being performed by the multi-SIM terminal in the first network; or,
    configuring the target parameter value according to a service requirement of a second service to be performed by the multi-SIM terminal in a second network, wherein the multi-SIM terminal is to connect to the second network after leaving the first network; or,
    configuring the target parameter value according to a difference between the service requirement of the first service and the service requirement of the second service.

3. The method according to claim 1, wherein sending the target parameter value comprises:
    broadcasting the target parameter value through broadcast signaling; or
    sending the target parameter value to the multi-SIM terminal through unicast signaling.

4. The method according to claim 3,
    wherein broadcasting the target parameter value through the broadcast signaling comprises:
    broadcasting a target system information block (SIB) through the broadcasting signaling after adding the target parameter value into the target SIB;
    wherein sending the target parameter value to the multi-SIM terminal through the unicast signaling comprises any one of:
    sending the target parameter value to the multi-SIM terminal through radio resource control (RRC) reconfiguration signaling; or sending on-demand system information comprising the target parameter value to the multi-SIM terminal through the unicast signaling after adding the target parameter value into the on-demand system information base upon an acquisition request that is sent by the multi-SIM terminal for requesting the on-demand system information.

5. The method according to claim 3, wherein before configuring the target parameter value for the multi-SIM terminal and sending the target parameter value to the multi-SIM terminal through the unicast signaling, the method further comprises:

receiving multi-SIM capability information of the multi-SIM terminal reported by the multi-SIM terminal.

6. The method according to claim 1, wherein the target duration indicates the duration for which the multi-SIM terminal is allowed to leave the first network within a preset time period.

7. The method according to claim 6, wherein the target duration indicates the duration for which the multi-SIM terminal is allowed to leave the first network within the preset time period in response to a connection conflict occurring between network connections, wherein the network connections are a network connection between the multi-SIM terminal and the first network and a network connection between the multi-SIM terminal and a second network, respectively.

8. The method according to claim 1, wherein the target duration is represented by at least one of a subframe amount or a frame amount.

9. The method according to claim 1, wherein the target parameter value further comprises a target number of times, and the target number of times indicates a maximum number of times the multi-SIM terminal is allowed to leave the first network.

10. A network switching method, performed by a multi-subscriber identity module (SIM) terminal, comprising:

receiving a target parameter value sent by a base station, wherein the target parameter value comprises at least a target duration, and the target duration indicates a duration allowed for the multi-SIM terminal from leaving a first network where the base station is located to switching back to the first network;

leaving the first network in which a data transmission is ongoing and switching to a second network in response to a connection conflict occurring between network connections, wherein the network connections are a network connection between the multi-SIM terminal and the first network and a network connection between the multi-SIM terminal and the second network, respectively; and switching back to the first network in response to determining that the target duration is reached from leaving the first network and switching to the second network.

11. The method according to claim 10, further comprising:

stopping at least one of a data transmission or a signaling transmission with the base station during communicating with the second network.

12. The method according to claim 10, wherein receiving the target parameter value sent by the base station comprises at least one of:

receiving the target parameter value broadcast by the base station through broadcast signaling; or, receiving the target parameter value sent by the base station to the multi-SIM terminal through unicast signaling, and wherein before receiving the target parameter value sent by the base station to the multi-SIM terminal through the unicast signaling, the method further comprises:

reporting multi-SIM capability information of the multi-SIM terminal to the base station.

13. The method according to claim 12, wherein reporting the multi-SIM capability information of the multi-SIM terminal to the base station comprises at least one of:

reporting the multi-SIM capability information to the base station during establishing a connection with the base station; or, reporting the multi-SIM capability information to the base station after establishing the connection with the base station.

14. The method according to claim 13, wherein reporting the multi-SIM capability information to the base station during establishing the connection with the base station comprises:

reporting the multi-SIM capability information to the base station through one or more target messages sent to the base station in a random access process, and wherein reporting the multi-SIM capability information to the base station after establishing the connection with the base station comprises:

reporting the multi-SIM capability information to the base station through UE-CapabilityRAT-ContainerList signaling after establishing the connection with the base station.

15. The method according to claim 10, wherein the target duration indicates the duration for which the multi-SIM terminal is allowed to leave the first network within a preset time period.

16. The method according to claim 15, wherein the target duration indicates the duration for which the multi-SIM terminal is allowed to leave the first network within the preset time period in response to the connection conflict occurring between the network connections, wherein the network connections are the network connection between the multi-SIM terminal and the first network and the network connection between the multi-SIM terminal and the second network, respectively.

17. The method according to claim 10, wherein the target duration is represented by at least one of a subframe amount or a frame amount.

18. The method according to claim 10, wherein the target parameter value further comprises a target number of times, and the target number of times indicates a maximum number of times the multi-SIM terminal is allowed to leave the first network.

19. A base station, comprising:

one or more processors; and one or more memories for storing instructions executable by the one or more processors;

wherein the one or more processors are configured to perform:

configuring a target parameter value for a multi-subscriber identity module (SIM) terminal, wherein the target parameter value comprises at least a target duration, and the target duration indicates a duration allowed for the multi-SIM terminal from leaving a first network where the base station is located to switching back to the first network; and sending the target parameter value.

20. A multi-subscriber identity module (SIM) terminal, comprising:

one or more processors; and one or more memories for storing instructions executable by the one or more processors;

wherein the one or more processors are configured to perform the network switching method according to claim 10.

\* \* \* \* \*